US005634052A

United States Patent [19]
Morris

[11] Patent Number: 5,634,052
[45] Date of Patent: *May 27, 1997

[54] SYSTEM FOR REDUCING STORAGE REQUIREMENTS AND TRANSMISSION LOADS IN A BACKUP SUBSYSTEM IN CLIENT-SERVER ENVIRONMENT BY TRANSMITTING ONLY DELTA FILES FROM CLIENT TO SERVER

[75] Inventor: Robert J. T. Morris, Los Gatos, Calif.

[73] Assignee: International Business Machines Corporation, Armonk, N.Y.

[*] Notice: The term of this patent shall not extend beyond the expiration date of Pat. No. 5,574,906.

[21] Appl. No.: 328,633

[22] Filed: Oct. 24, 1994

[51] Int. Cl.⁶ .................................................. G06F 13/00
[52] U.S. Cl. .................... 395/601; 395/200.09; 395/489; 395/182.02
[58] Field of Search ..................... 395/600, 700, 395/200.01, 489, 182.02, 601, 200.09

[56] References Cited

U.S. PATENT DOCUMENTS

| 4,912,637 | 3/1990 | Sheedy et al. | 364/300 |
|---|---|---|---|
| 5,005,122 | 4/1991 | Griffin et al. | 395/200.01 |
| 5,263,154 | 11/1993 | Eastridge et al. | 395/575 |
| 5,278,979 | 1/1994 | Foster et al. | 395/600 |
| 5,418,945 | 5/1995 | Carter et al. | 395/600 |
| 5,481,722 | 1/1996 | Skinner | 395/700 |
| 5,495,607 | 2/1996 | Pisello et al. | 395/600 |
| 5,574,906 | 11/1996 | Morris | 395/601 |

OTHER PUBLICATIONS

T. C. Bell et al., "Text Compression", Prentice Hall, pp. 206–235.
M. J. Rochkind, "The Source Code Control System", IEEE Trans. on Software Engineering, vol. SE–1, No. 4, Dec. 1975, pp. 364–370.

Primary Examiner—Lance Leonard Barry
Assistant Examiner—Le Hien Luu
Attorney, Agent, or Firm—Paik Saber

[57] ABSTRACT

In a client/server environment having a backup subsystem, a method and means for reducing the storage requirement in said backup subsystem and further reducing the load on the transmission bandwidth between the clients and the backup subsystem. This is accomplished by maintaining a copy of frequently accessed files on both the server and clients when a file is modified on the client, a delta file which is the difference between the base file and the modified version of the base file is created and transmitted to the server to be stored on a storage medium which is part of the backup subsystem. Alternatively, whenever a client modifies a file, the base version of that file is transmitted to the client from the server, a delta file is created and transmitted to the server to be stored on the storage device which is part of the backup subsystem. Alternatively, modified files are transmitted to the backup server and the differencing is carried out at the backup server.

21 Claims, 5 Drawing Sheets

Backup Operation at Client

Backup Operation at Server

FIG. 4

SYSTEM FOR REDUCING STORAGE REQUIREMENTS AND TRANSMISSION LOADS IN A BACKUP SUBSYSTEM IN CLIENT-SERVER ENVIRONMENT BY TRANSMITTING ONLY DELTA FILES FROM CLIENT TO SERVER

CROSS-REFERENCE TO RELATED APPLICATION

U.S. patent application docket number SA9-94-053, entitled SYSTEM AND METHOD FOR REDUCING STORAGE REQUIREMENT IN BACKUP SUBSYSTEMS UTILIZING SEGMENTED COMPRESSION AND DIFFERENCING, was filed on the same day, owned by a common assignee and having the same inventor as the present invention

BACKGROUND OF THE INVENTION

1. Technical Field

This invention relates in general to improvements in the field of computer systems having backup/restore or archive/retrieve subsystems. More particularly, this invention relates to a method and system for reducing the storage requirements of backup subsystems in client-server environments.

2. Description of the Background Art

In a data processing system, a backup/restore subsystem, usually referred to as backup subsystem, is typically used as a means to save a recent copy or version of a file, plus some number of earlier versions of the same file, on some form of backup storage devices such as magnetic disk drives, tapes, or optical storage devices. The backup subsystem is used as a means of protecting against loss of data in a given data processing system. For example, if an on-line version of a file is destroyed or corrupted because of power failure, hardware, or software error, user error or some other type of problem, the latest version of that file which is stored in a backup subsystem can be restored and therefore the risk of loss of data is minimized. Another important use of backup subsystems is that even if failures do not occur, but files or data are deleted or changed (either accidentally or intentionally), those files or data could be restored to their earlier state thus minimizing the loss of data.

Therefore, it can readily be apparent that backup subsystems are and will remain an important part of the field of data processing.

A closely related concept to the backup subsystem is a method and system called archive/retrieve, usually referred to as an archive subsystem. Archiving refers to making copies of files on lower cost storage such as tape so that files can be deleted from more expensive storage such as disk storage. Since disk storage is frequently being updated, an archival copy also allows the state of a collection of data to be captured for later reference, even if the primary copy of the data is not going to be deleted. An example would be the archiving of a set of financial data at the end of a fiscal period. Although the improved method of carrying out the backup disclosed in this application is primarily described for a backup system, it will be obvious to a person of ordinary skill in the art of data processing that the systems and methods described herein are also applicable to archive systems or other related storage management systems.

At the present time, the majority of backup subsystems run on host systems located in a data processing environment. Typically, a new version (also referred to as changed version) of a file is backed-up based on a predetermined schedule such as, at the end of each day, or after each time that a file has been updated and saved.

Backup systems generally consume large amount of storage media because multiple versions of large amounts of data are being backed up on a regular basis. Therefore, those engaged in the field of data processing and especially in the field of backup/restore systems are continuously striving to find improved methods and systems to reduce the storage demand in backup systems. Current backup systems typically utilize one or both of the following methods to enable the storage of and retrieval of multiple versions of a given file. These are: (1) the full backup method and (2) the incremental backup method.

The full backup method is the most basic method used which requires the backup of an entire collection of files, or a file system, regardless of whether individual files in that collection have been updated or not. Furthermore, in the full backup method multiple full versions of each file are maintained on a storage device. Since maintaining multiple full copies of many files consumes substantial amount of storage, some type of compression technique is sometimes used to reduce the amount of data stored. Compression techniques basically rely on the presence of redundancy within the file, so called intra-file redundancy, in order to achieve this reduction. The most common method is the use of a method of file compression known as Lempel-Ziv method (also known as Adaptive Dictionary Encoder or LZ coding) described in a book by T. C. Bell et. al., titled Text Compression, pp 206-235. The essence of Lempel-Ziv coding is that phrases are replaced with a pointer to where they have occurred earlier in the text, thereby saving the storage space associated with multiple occurrence of any given phrase. This is a general method which can be applied to any file and typically results in compression ratios of the order of between 2 and 3.

Incremental backup method is an alternative to full backup method used in backup systems where only those files, in any given collection of files, are backed up which have been changed since the previous incremental or full backup.

It is apparent to those skilled in the art that in any given backup system, the higher the backup frequency, the more accurately the backup copy will represent the present state of data within a file. Considering the large volume of data maintained and continuously generated in a typical data processing system, the amount of storage, time, and other resources associated with backing up data are very substantial. Thus, those skilled in the art are continuously engaged in searching for better alternatives and more storage and time efficient systems and methods for backing up data.

Aside from the compression technique which is heavily utilized to reduce storage requirement in a backup system, there exists a quite different method of achieving reduction in file size, known as delta versioning. Delta versioning has never been used in any backup system.

Delta versioning which is also referred to as "differencing" or "deltaing" relies on comparison between two files where multiple version of a file is saved in a form of a "base" file, also called a "base version" of a file, together with predetermined number of small files which represent only the changes to the base file. The small files, also referred to as "delta" files or "difference" files, contain the difference or delta from the base file. Delta files are generated as a result of comparing the base file with a later (newly arrived) or an earlier version of the base file. Thus this method of storage reduction exploits redundancy between files, or "inter-file"

redundancy, in order to achieve reduction in storage requirement. This method which is used in the software art of Source Code Control Systems, discussed in a reference below, can provide substantial storage savings in backup applications, since frequently the selection of a file for incremental backup occurs after a small change has been made to that file. Therefore, since many copies are frequently made in backup systems to files that differ only slightly from one another, the differencing method offers great potential for substantial reduction in the amount of data stored in backup subsystems. At the present time none of the backup systems utilize delta versioning.

Delta versioning falls into two general classes: one is where the base file is the oldest version of a file and the delta files represent newer versions. This method is referred to as "forward" deltas. The other is where the base file is the latest version of a file and the delta files represent older versions. This method is referred to as "reverse" deltas. The "reverse" delta is the more common method because usually the most utilized version of a file is the last version created.

A technical paper by M. J. Rochkind, titled "The Source Code Control System", IEEE Transaction on Software Engineering, Vol. SE-1, No. 4, Dec. 1975, PP 364–370, teaches a software tool, known as source code control system (SCCS) which is designed to help managing changes to a source code (source program) in the field of software development tools. In SCCS environment, every time a module (file) is changed the change is stored as a discrete delta where the space required to store a delta is only slightly greater than the amount of text inserted by that delta. However, Rochkind does not teach or suggest the use of delta files in a backup and archiving subsystem in either a central or a client-server environment as a means for reducing the storage requirements of such subsystems.

U.S. Pat. No. 4,912,637 issued on Mar. 27, 1990 to C. R. Sheedy et al., teaches a system for preserving, generating, and merging various versions of the same file by a modified delta method. Sheedy teaches using an indexed line file where every line active in any version of a given file is stored, together with a variant history file where the history of the status of each line in various versions is recorded. Using these two files, any desired version of a program may be generated directly without the need for creating any of the intermediate versions. However, Sheedy does not teach or suggest the use of this modified method in backup and archiving systems in either a central processing or a client/server environment as a means for reducing the storage requirement of a packup system.

U.S. Pat. No. 5,263,154, issued on Nov. 16, 1993 to L. E. Eastridge et al., teaches a method and system for incremental backup copying of a file in a data processing system which minimizes the suspension of the data processing system during such backup copying. This is done by first physically backing up a data set on a storage subsystem on a scheduled or opportunistic basis. Thereafter, creating side-files of the data set modified. The side-files are then used in the next scheduled or opportunity to update the backed-up data set. However, Eastridge does not teach or suggest the use of delta files as a means of minimizing storage requirement in a backup and archiving subsystem in either a central processing environment or a client-server environment.

U.S. Pat. No. 5,278,979 issued on Jan. 11, 1994 to R. D. Foster, et al., teaches a method and system in the field of software code development known as Single Entity Versioning where by creating and maintaining a unique version identification and a control data file, multiple versions of source data is efficiently stored in a single entity. However, Foster does not teach or suggest the use of delta versioning or Single Entity Versioning as a means of minimizing storage requirement in a backup and archiving subsystem in either a central processing environment or a client-server environment.

Considering that the amount of the data generated on the daily basis by the computers is growing at a very fast rate, there is a need for an improved and innovative method and system to reduce the storage requirements of backup systems in central data processing systems and further in client-server environments which as will be discussed below present unique backup issues.

Backup Subsystems in a Client-Server Environment

Figure 1:
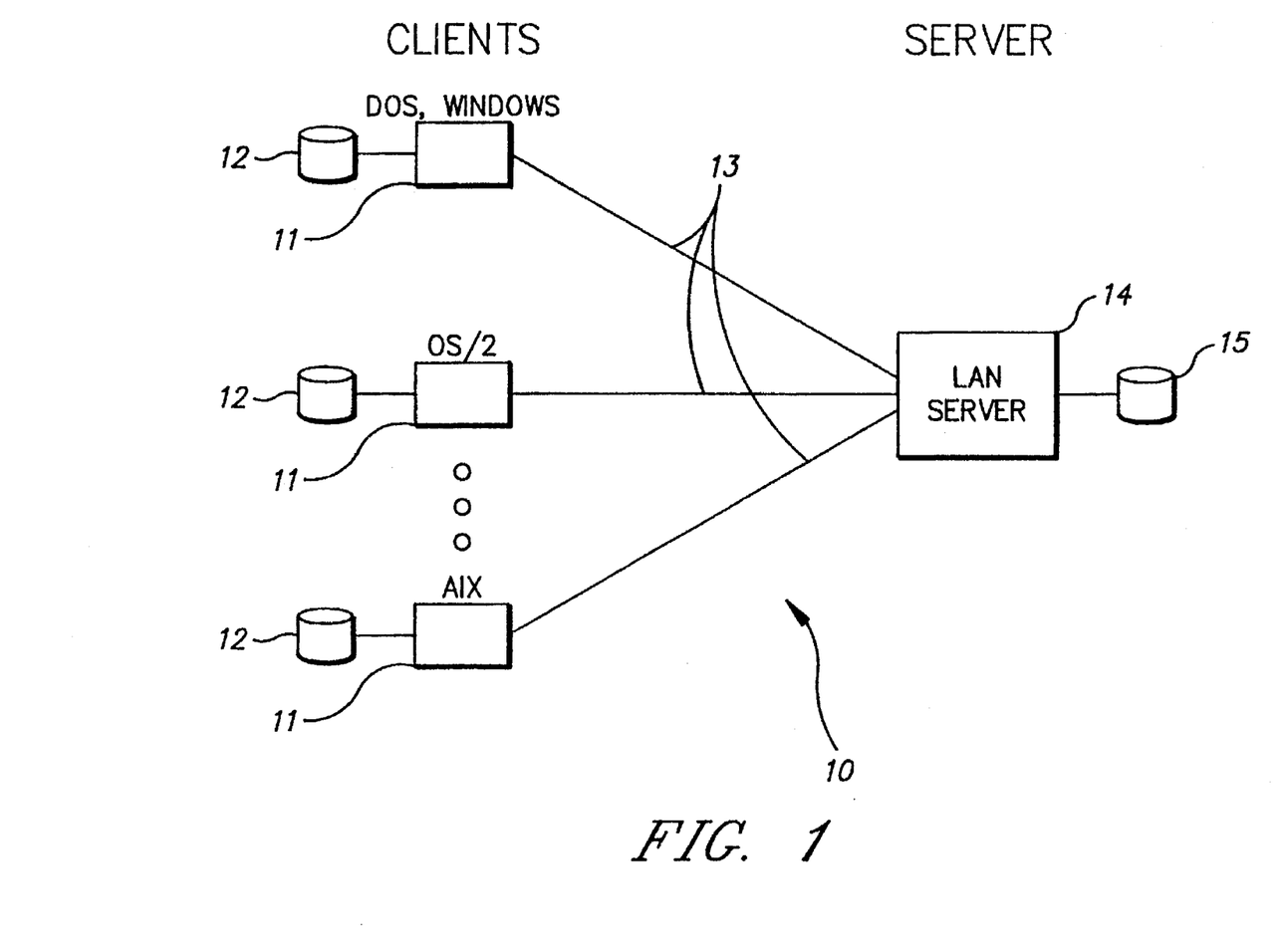
FIG. 1 is a schematic diagram of a typical client-server environment.

Recently, the emergence of low cost local area networking, personal computer, and workstation technology has promoted a new type of data processing architecture known as the , "client-server" system or environment. A client-server system 10, as shown in FIG. 1, typically consists of: (1) client computers (also referred to as clients) 11 such as personal computers or workstations with their own local storage medium 12 such as disk storage devices; (2) a local area network (also referred to as LAN or network) 13 such as an Ethernet or a Token Ring which links the clients to the LAN server(s); and (3) one or more LAN server computers 14 such as a personal computer or perhaps a workstation with its own local storage mediums 15 such as disk storage devices, tape storage and/or optical storage devices.

In a client-server environment, the majority of the data processing is usually carried out at the clients which are connected by a local area or other network to a LAN server. The LAN server usually contains various programs or data which are commonly used by many of the clients. Computer users which usually use clients to carry on their data processing tasks, are generally in control of the client computers whereas the LAN server(s) is usually administered by an expert administrator of a data processing (computing) center.

The client-server environment presents a number of major issues as relates to data processing, integrity, and backup of such data. One major concern in the client-server environment is that a substantial amount of important data is located on client subsystems which lack the security, reliability or care of administration that is typically applied to the server machine(s). There is a further concern that data may accidentally be lost from a client computers, because the users of such computers do not take time and necessary care to back up the data on a regular basis. There is yet another concern that the amount of data residing on the clients are so substantial that even if a client-server backup subsystem could be developed to attempt to backup all these data, the amount of backup storage required to save all the data on the clients would be inordinate and impractical. The lack of an efficient backup system and method has been a major barrier to the adoption and rapid growth of client-server technology despite its many attractive features.

Recently a number of client-server backup systems have been developed to alleviate some of the concerns listed above. An example is an IBM's ADSM (ADSTAR Distributed Storage Manager) product. This technology overcomes some of the deficiencies mentioned above by making backup copies of the client data on a backup server. The client copies are made automatically without user involvement and are stored on storage devices which are administered by the backup server.

A typical client-server backup subsystem such as ADSM operates as follows. In the client computer a program exists, known as the client backup program, which at pre-specified or periodic times is activated and makes contact with a program residing on the backup server, known as the server backup program. After establishing contact and establishing authentication, the server backup program then consults "policy data" which instructs the server backup program as to what sort of a backup operation should occur and which files on the client computer are the subjects of the current backup. It then searches all or a subset of files on the client computer, determining which files should be backed up. For example, a data file which has changed since the backup program was last run may cause that file to be selected for the backup operation. After selecting the files to be backed up, the client backup program transmits those files, using the LAN, to the server backup program. The server backup program then makes an entry in a "backup catalog" for each file received and then stores those files on storage devices attached to the backup server.

The server backup program also carries out several other important operations. One such operation is the maintenance of its storage pools. For example, backup copies of files that were made many months ago may be moved from disk storage to tape storage in order to reduce storage costs. Another important function of the client and server backup programs occurs when the user requests the restoration of a file. The client backup program contacts the server backup program which consults its backup catalog to establish the location of the backup copy of the file. It then returns that file across the network to the client computer which in turn makes it available to the user.

Hardware which is typically needed for implementing a backup system in a client-server system includes: one or more server computers such as PC or workstations and storage mediums such as IBM 3390 magnetic storage system, IBM 3494 tape storage library or IBM 3595 optical library. These libraries which provide automated mechanical mounting and demounting of tape or optical cartridges into read/write drives and retrieve them from or replace them within the storage shelves are sometimes referred to as "jukeboxes".

Despite the recent improvements made in the field of client-server backup systems, several shortcomings have remained in all client-server backup systems including ADSM. One of the shortcomings, as mentioned earlier, is that the very large number of files on the clients now being regularly backed up tend to generate very large amounts of data resulting in large storage requirements and therefore substantially more cost in backing up data. Although systems such as ADSM compress this data on the storage devices, the amount of data remains very large. A second difficulty that is being observed is that the local area network technology is frequently unable to complete transmission of all of the changed files, even in only an incremental backup, to the backup server during the designated period for backup operations (e.g., a night shift). This is due to the bandwidth limitation of the communication network (which might include low speed remote telephony data links) and large amount of data that has to be transmitted from numerous clients to the backup server.

It is apparent now that implementation of an efficient backup subsystem in a computer processing environment is a formidable task and in a client-server environment poses significant challenges of its own. Therefore, there is a need for a new and novel backup method and system in a client-server environment that not only substantially reduces the storage requirement of backup subsystem but also minimizes the burden on the communication link between the clients and the backup server. The present invention addresses these two major deficiencies currently present in all client-server backup subsystem by providing alternative methods and systems which can be used to reduce the amount of data storage required in a client-server backup subsystem and reduces the burden on the bandwidth of the transmission network.

SUMMARY OF THE INVENTION

It is therefore an object of the present invention to provide improved backup and archiving methods and subsystems in a data processing environment.

It is a further object of the present invention to provide improved backup and archiving methods and subsystems in a client-server environment.

It is a further object of the present invention to reduce network transmission cost in a client-server environment.

It is another object of the present invention to reduce data processing loads on a backup server in a client-server environment.

It is another object of the present invention to reduce the transmission bandwidth requirement in a client-server environment.

It is another object of this invention to provide a method and system for utilizing differencing as a means for reducing storage requirement in a backup subsystem.

It is yet a further object of the present invention to provide a method and system for utilizing differencing as a means for reducing the network transmission cost.

It is another object of the present invention to provide a method and system for utilizing differencing as a means for reducing the storage requirement in the backup subsystem of a client-server system.

The foregoing objects are achieved by the invention disclosed herein. Briefly stated, in one embodiment of the invention, a file, called the "new" file (also referred to as new version of the base file or changed version of the base file or updated version of the base file), is recognized to have been changed at the client, and is then transmitted to the backup server (referred to as server). At the server the new file is differenced against the previous version of the file, called the "previous" file (also referred to as the "base" file) to produce a file referred to as new delta file. This new delta file can simply be stored along with the changed version of the base file or the base file depending on whether reverse or forward delta versioning is used, respectively. Based on controlling policy management, if a fixed limit on the number of delta files is enforced, then the oldest delta is deleted.

In another embodiment of the present invention, in a client-server environment, the differencing operation is carried out by the client rather than the server. However, in order for the client to carry out the differencing operation, it needs to keep a copy of the base file at the client. When the base file is modified on the client, then a new delta file is created by the client and transmitted to the server. The server may simply save the new delta and then use it at a later time to modify the base file in the backup subsystem, or may apply it immediately against the base file to create a copy of the new file.

Alternatively, instead of storing a copy of the base file at the client for the purpose of differencing, the base file may simply be transmitted to a client whenever the client needs to modify the base file. Once the base file is modified on the client, a new delta file is created and transmitted back to the server to be used and stored by backup subsystem. Note that by carrying the differencing at the client rather than the server, the size of the file that has to be sent back to the server is substantially reduced, thereby substantially reducing the burden on the transmission network.

It should be noted that whereas compression typically results in a space saving factor of two or three, the space saving when utilizing differencing can be much larger. For example, if n versions of a file are saved and they contain only small differences (e.g., a few lines are changed or appended in each file), then the space saving factor can approach n.

Therefore, the use of a differencing method is a significant breakthrough in the art of backup systems, especially in client-server environments, since current backup systems such as ADSM do not use differencing as a means of substantial reduction in storage requirements at the server and substantial reduction of transmission cost between the clients and the server.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best mode presently contemplated for carrying out the invention. This description and the number of alternative embodiments shown are made for the purpose of illustrating the general principle of the present invention and is not meant to limit the inventive concepts claimed herein.

Figure 2:
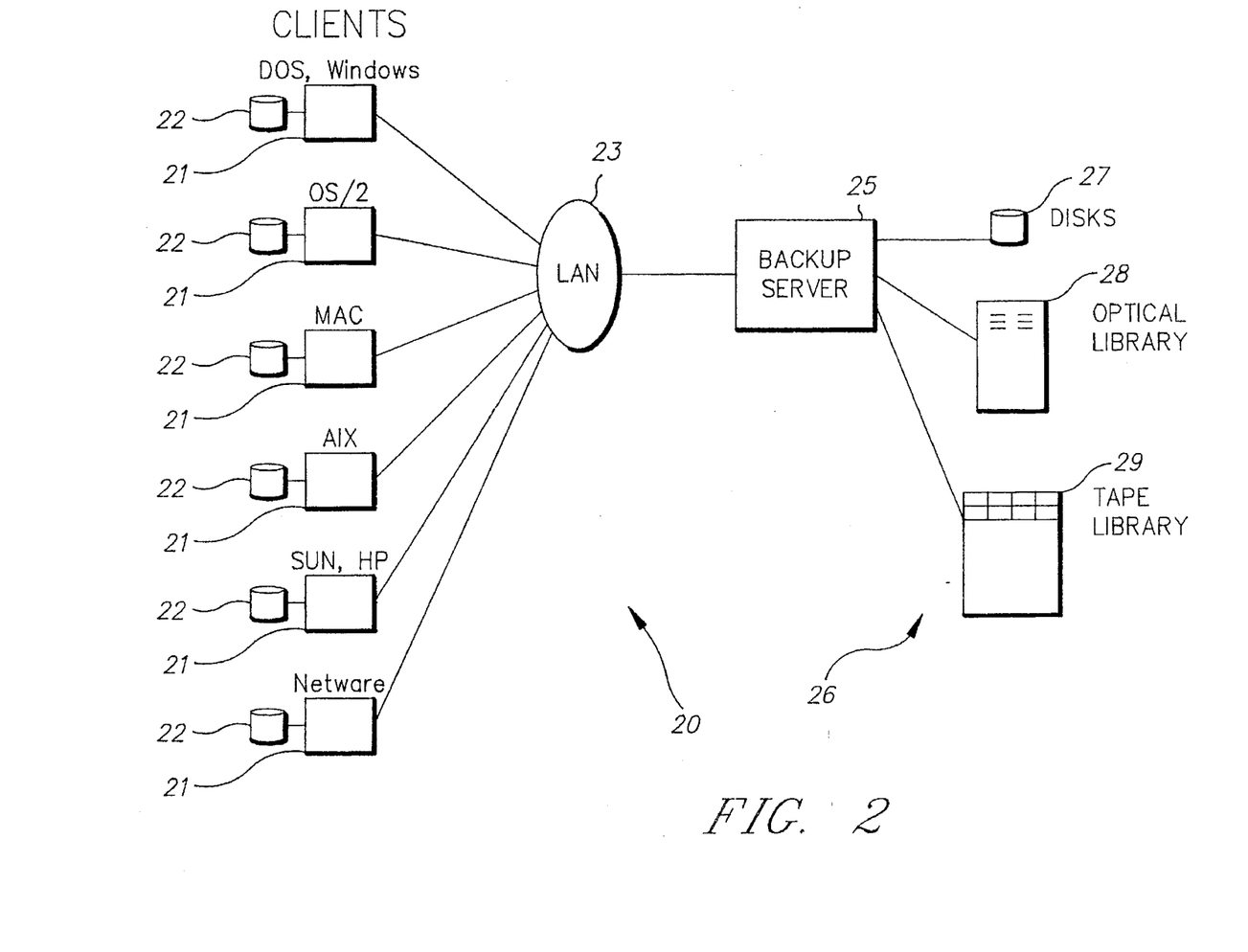
FIG. 2 is a schematic diagram of a client-server environment having a backup subsystem.

With reference now to FIG. 2, there is shown a client-server system 20 having a backup subsystem. System 20 typically includes a plurality of client computers 21 with their own local storage medium 22 such as disk storage devices. The client computers (clients) 21 may typically be personal computers of the type having a system unit (not shown) which includes CPU (processor), I/O control, and semiconductor and magnetic memories and DOS, OS/2, or Apple Macintosh operating systems. The client computers 21 may further be workstations of the type having AIX, UNIX or equivalent operating systems. These operating systems are well known to those skilled in the art of data processing and need no further description.

Still referring to FIG. 2, the client-server system 20 further includes a local area network (LAN) 23 such as Ethernet or a Token Ring which provides the communication link between the clients 21 to the backup server(s) 25.

Backup server computer 25 may typically be a personal computer of the type having a system unit (not shown) which includes CPU (processor), I/O control, and semiconductor and magnetic memories and DOS, OS/2 or Apple Macintosh operating system. It may also be a workstation having a system unit and UNIX or AIX or equivalent operating system. It may also be a large system running the AS/400, VM or MVS operating systems. Computer 25 further has its own local storage mediums 26 such as disk storage devices 27, optical library (storage) devices 28, or tape library (storage) devices 29. In a client-server system 20 shown in FIG. 2, backup subsystem usually resides at the backup server 25. A typical backup subsystem that resides at the server is IBM Advanced Distributed Storage Manager (ADSM) which has been explained in detail in the background section of this application. The operation and physical implementation of personal computers, workstations, disk storage devices, optical library, tape library and their constituents are well known to those skilled in the art of data processing and requires no further description.

General Notation

We now state a general notation for describing "base file" and "delta file" storage which will be applicable to all the embodiments described herein.

We will assume that a versioned sequence of files which are stored at the server can be represented in the general form:

$$[d\_1, d\_2, \ldots, d\_n, F, d\_{n+1}, \ldots, d\_m],$$

where F is a base file and the files:

$$(d\_1, d\_2, \ldots, d\_m)$$

represent delta files, with $d\_1$ representing the most recent delta and $d\_m$ representing the least recent delta associated with the base file F. The deltas $d\_1, \ldots, d\_n$ can be thought of as forward deltas since they can be applied to F to generate a more recent version of the file than F, whereas the deltas $d\_{n+1}, \ldots, d\_m$ can be thought of as backward deltas since they can be applied to file F to generate an older version of the file than F.

In the case that the base file in a versioned sequence is the latest file stored in the backup subsystem, such versioned sequence may be represented by:

$$[F, d\_1, d\_2, \ldots, d\_m]$$

Note that in this notation upper case letters denote base files, and lower case letters denote delta files. Delta files represent changes to the base file, and may be applied to a base file using the transformation R ("roll forward" or "roll backwards") and the differencing transformation diff(,).

we define the pair of operations diff(,) and R(,) as follows:

$$\text{diff}(A,B)=d$$

$$R(d,A)=B.$$

Thus the sequence:

$$[d\_1, d\_2, \ldots, d\_n, F, d\_{n+1}, \ldots, d\_m]$$

can be "rolled forward" to result in:

$$[d\_1, d\_2, \ldots, d\_n, F, d\_{n+1}, \ldots, d\_m]$$

using the operations:

$$G=R(d\_n,F)$$

and $$e = \text{diff}(G, F);$$

or "rolled backwards" to result in:

$$[d\_1, d\_2, \ldots, d\_n, e, G, d\_{n+2}, \ldots, d\_m]$$

using the operations:

$$G = R(d\_{n+1}, F)$$

and $$e = \text{diff}(G, F).$$

Thus, any file in a versioned sequence from the most recent to the least recent may be produced at will using these operations. These operations are carried out at the backup server 25 using the server 25 CPU.

This method of managing versioned sequences of files is known in the art of Source Code Control Systems. For example, it is illustrated in IBM AIX Version 3.2 Command Reference, pages 1–618 through 1–621, a copy of which is enclosed, that given two UNIX text files called FileA and FileB the UNIX command:

$$\text{diff-e FileA FileB>delta,}$$

which is carried out using a processor of a computer, produces a file called delta containing the differences between FileA and FileB. The command option '–e' causes the delta file to be in a form suitable for use with the 'ed' editor. FileB can then be reconstructed from FileA and delta using the UNIX command:

(cat delta; echo '1,$p')|ed–FileA>FileB.

This method can easily be extended to allow any previous version of the base file to be reconstructed from a chain of delta files. If the changes to the base file are small, and the n most recent version of the base file are kept, this method will reduce the storage requirement by a factor of almost n. This is a substantial improvement over LZ coding which reduces the storage requirement, in general, only by a factor of 2 or 3.

Substantial reduction in network load is achievable by transmitting only deltas across the network to files, rather than the whole changed files. This method and system provides a major advantage for all backup systems including those backup systems operating over dial-up or narrow band transmission lines where bandwidth is extremely scarce and valuable.

It should be noted that the detailed embodiments are illustrated here by providing flowcharts for the treatment of text files, i.e., ASCII files containing "new line" characters. This will allow us to illustrate embodiments using the standard and well known UNIX text file commands of diff, cat, ed, etc. However, it will be clear to one skilled in the art that the present invention apply equally well to files which are not text files, and that exactly the same methods are applicable.

Having established the general notation, we can now describe the best mode contemplated for carrying this invention in a client-server environment having a backup subsystem.

Figure 3A:
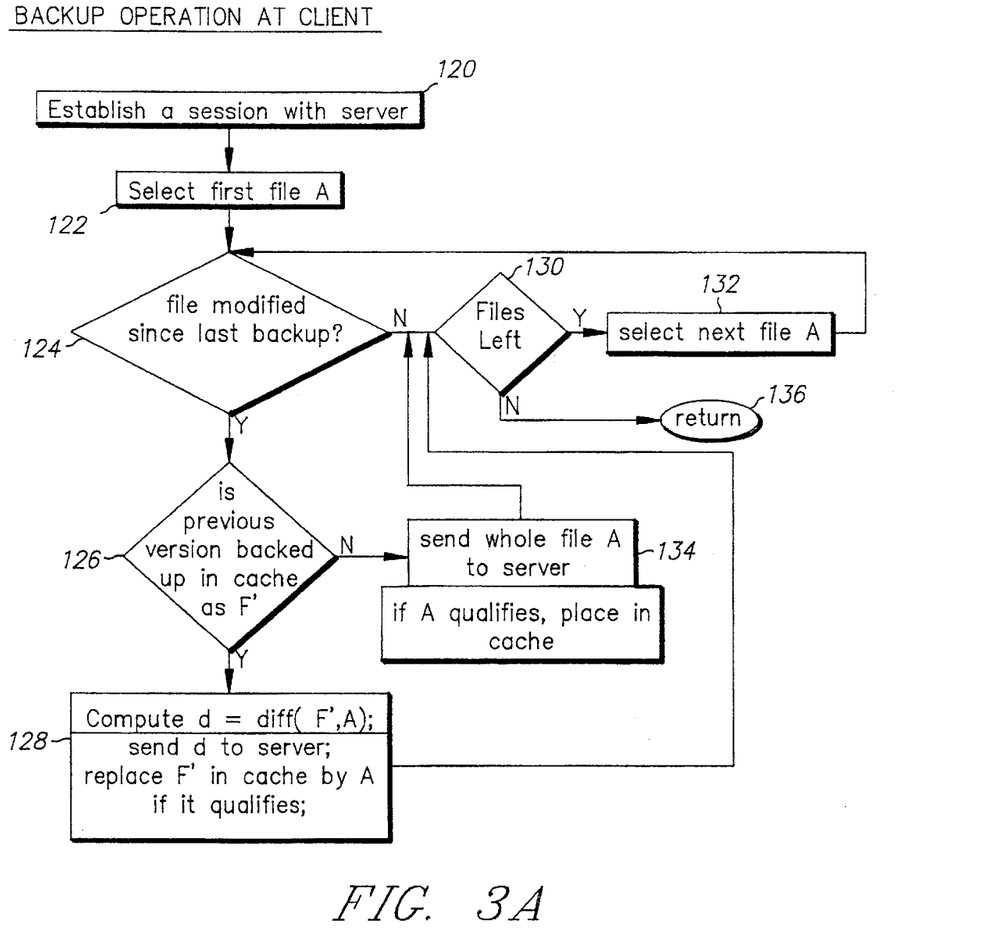
FIG. 3A is a flow chart illustrating the Backup operation at the client of the preferred embodiment of the present invention.
Figure 3B:
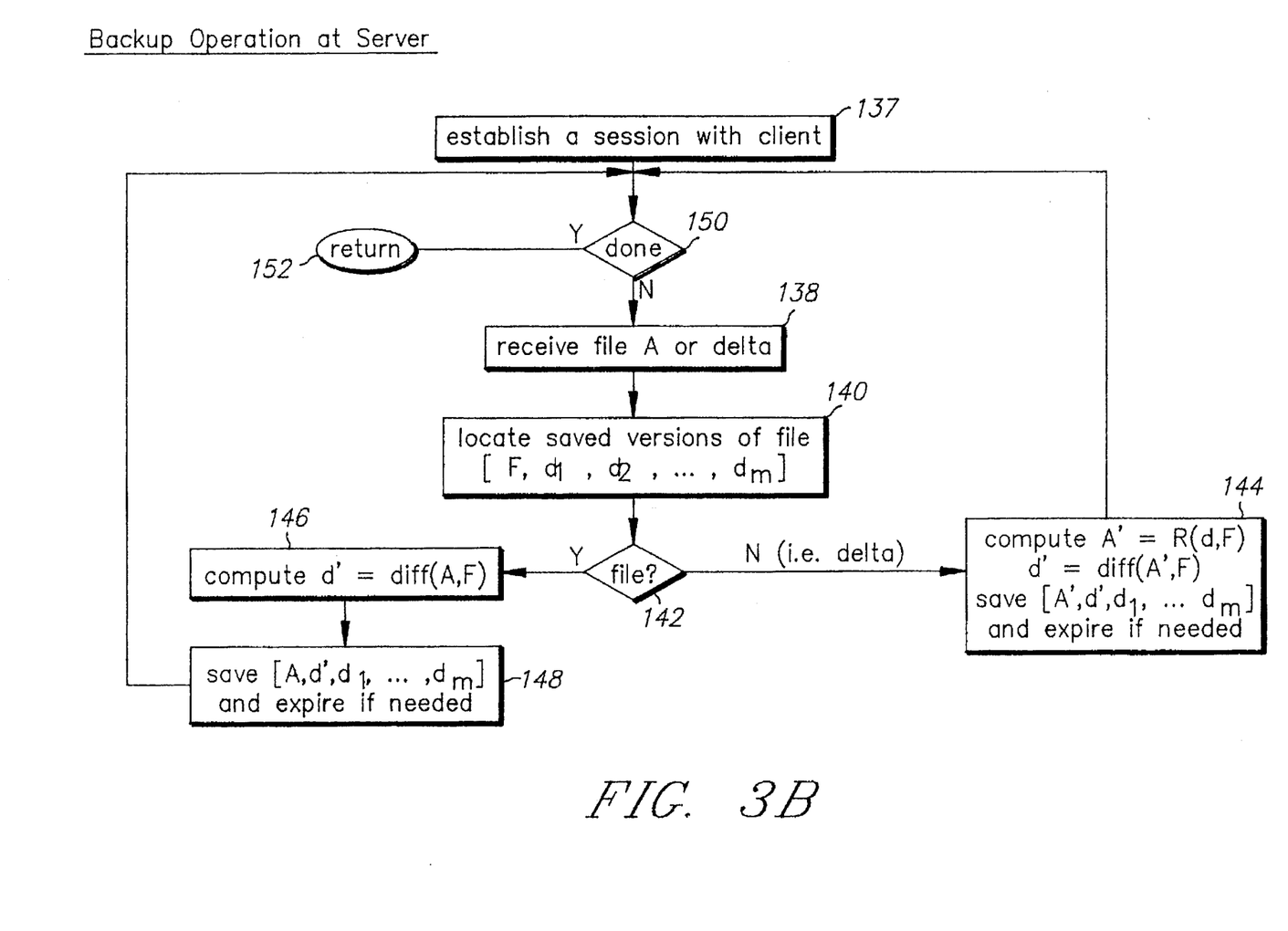
FIG. 3B is a flow chart illustrating the Backup operation at the server of the preferred embodiment of the present invention.

FIGS. 3A and 3B together show a high level logic flow chart of the preferred embodiment of the present invention which illustrates differencing at the client or server, respectively, in accordance with the method and system of the present invention. With reference now to FIGS. 2, 3A and 3B, this method proceeds as follows:

The client backup program residing at the client 21 establishes a backup session by contacting the backup program on the server 25 as depicted by block 120. Concurrently the server backup program establishes a session with the client 21 as depicted by block 137. Thereafter, the process passes to block 122 which depicts the selection of the first file, shown as file A, by the client backup program for examination. Next, as depicted by block 124, the file A is examined by the client backup program to find out if it has been changed since last backup. If the file A has been changed since last backup, client backup program checks to see whether the client 21 has kept a copy of the base file F (previous version of A) in its cache memory from the last time it was backed up as depicted by block 126. If the copy of the base file F, labelled F' is found, the client 21 performs the operation d=diff(F',A), and transmits d, the delta file, to the server 25 with file A replacing file F' at the client 21 as depicted by block 128.

If the copy of the base file F, labelled F' is not found on the client 21 cache memory, then the whole file A is transmitted by the client to the server 25 as depicted by block 134. If file A qualifies as a file that should be placed in client 21 cache memory, a copy of file A is also stored at client 21 caches memory as depicted by block 134. Qualification criteria could be based on the frequency at which the file A is being changed by the users of the client computer.

If the file has not been modified since last backup, the client backup program determines if any file is left on the client 21 that has not been checked as depicted by block 130. If any file is left the file is selected and examined by the client backup program to find out if it has been modified since last backup session as depicted by block 122. If no file is left, then the backup session is terminated as depicted by block 136.

Still referring to FIGS. 2, 3A and 3B, assuming that a backup session has been established between the client 21 and the server 25 as depicted by the block 137, the server 25 either receives file A or a delta file d from the client 21 as depicted by block 138. Next, as depicted in block 140, the server 25 consults the backup catalog, and locates the saved versions of the file, referred to as the versioned sequence:

$$[F, d\_1, d\_2, \ldots, d\_m]$$

which is stored at backup storage mediums 26 and where F is the base file, $(d\_1, \ldots, d\_m)$ are delta files, and the versioned sequence represents m+1 previous versions of the file A. Note that copy F' and the base file F are identical, but at different locations, i.e., the former at the client 21 and the latter at the server 25.

Thereafter the server backup program determines whether the file that was received from the client 21 was a changed version of the base file, i.e., file A, or a delta file d representing the difference between file A and the base file F (block 142). Assuming that the client 21 has transmitted the delta file d to the server 25, the operation moves to block 144 which shows that the server 25 then performs the operations:

$$A' = R(d, F)$$

and $$d' = \text{diff}(A', F),$$

and updates the version history of the file to:

$$[A', d', d\_1, \ldots, d\_m]$$

where A' is identical to A, but at a different location. Note that d' is the inverse delta to d, i.e., d translates F to A and d' translate A to F. The backup operation then moves to block 150 where server backup program determines whether all the files transmitted have been received. If all the files transmitted have been received the backup session is terminated as depicted by block 152. If all the files transmitted have not been received yet, the backup operation moves to block 138 and repeat itself until all the files received from the client 21 have been processed.

If client 21 has transmitted the changed version A of the file F, the operation moves to block 146 which depicts that the server 25 then performs the operation:

$$d'=\text{diff}(A,F)$$

using the server processor (not shown). Thereafter, the operation moves to block 148 which depicts that the server 25 updates the versioned sequence representation, using the server processor, to $$[A, d', d\_1, d\_2, \ldots, d\_m].$$

The backup operation then moves to block 150 to determine whether all the files transmitted has been received. If all the files transmitted have been received the operation terminates as depicted by block 152. If all the files transmitted have not been received yet, the operation moves to block 138 and repeat itself until all the files received have been processed.

At any time after file A has been backed up if the client 21 needs to restore file A, it first checks to see whether it can be found in the client 21 cache memory. If not, it requests a copy from the server 25, and the server immediately locates and transmit A' to the client 21.

This method substantially reduces the transmission load by transmitting only a delta version of the file across the network and significantly reduces the backup storage requirement by storing only delta files rather than full multiple copies of base files. The cost is that a copy of some subset of base files, according to a certain qualification criteria, must be maintained at the client. This is a tradeoff between storage space and transmission speed and burden which may be profitably exercised if network bandwidth is scarce, as is often the case, particularly in the case of dial-up or narrow band backup service.

Note that only the most previously backed up version of the file (and not any older versions) needs to be saved at the client 21 if this savings is to result. However, it is found that files that change one day are quite likely to change the next day or at a time in the near future. This phenomenon is known as "temporal locality of access" and is well known in the art. Thus we can maintain a subset of files on client cache memory which have been recently backed up and use this cache expressly for the purpose of reducing transmission cost of subsequent backups. Note that this cache has also other uses. For example, if a file is accidentally deleted it may be restored immediately from the cache.

It should also be noted that at most one copy of any file is ever stored in this cache. The question arises as to which files should be saved in this cache, for example if it is known that files will be repeatedly backed up they are good candidates. Since the cache is also of finite size, there is also the question of which file is deleted (or "replaced") when space is needed in this cache. The Least Recently Used (LRU) rule may be used to decide which file should be deleted.

It is recommended that this cache represent a storage space equal to 1% to 5% of the storage available on the client 21 in order for this cache to result in a large decrease in network bandwidth. Furthermore, the files stored in the cache can be stored compressed for an additional space saving.

An alternative to the use of a cache, is to transmit the file F from the server 25 to the client 21 and perform the differencing against the received file at the client 21. This alternative is attractive in at least two situations: (1) when processing resource at the server is scarce and client processing resource is idle and (2) in communication situations with asymmetric bandwidth such as in mobile computing.

An alternative approach to the use of a cache memory and the keeping of previous copies of files is to use the differential file system described by Gray and Reuter in Transaction Processing: Concepts and Techniques, 1992 pages 726–728, a copy of which is included, although the complexity involved is probably unwarranted.

Figure 4:
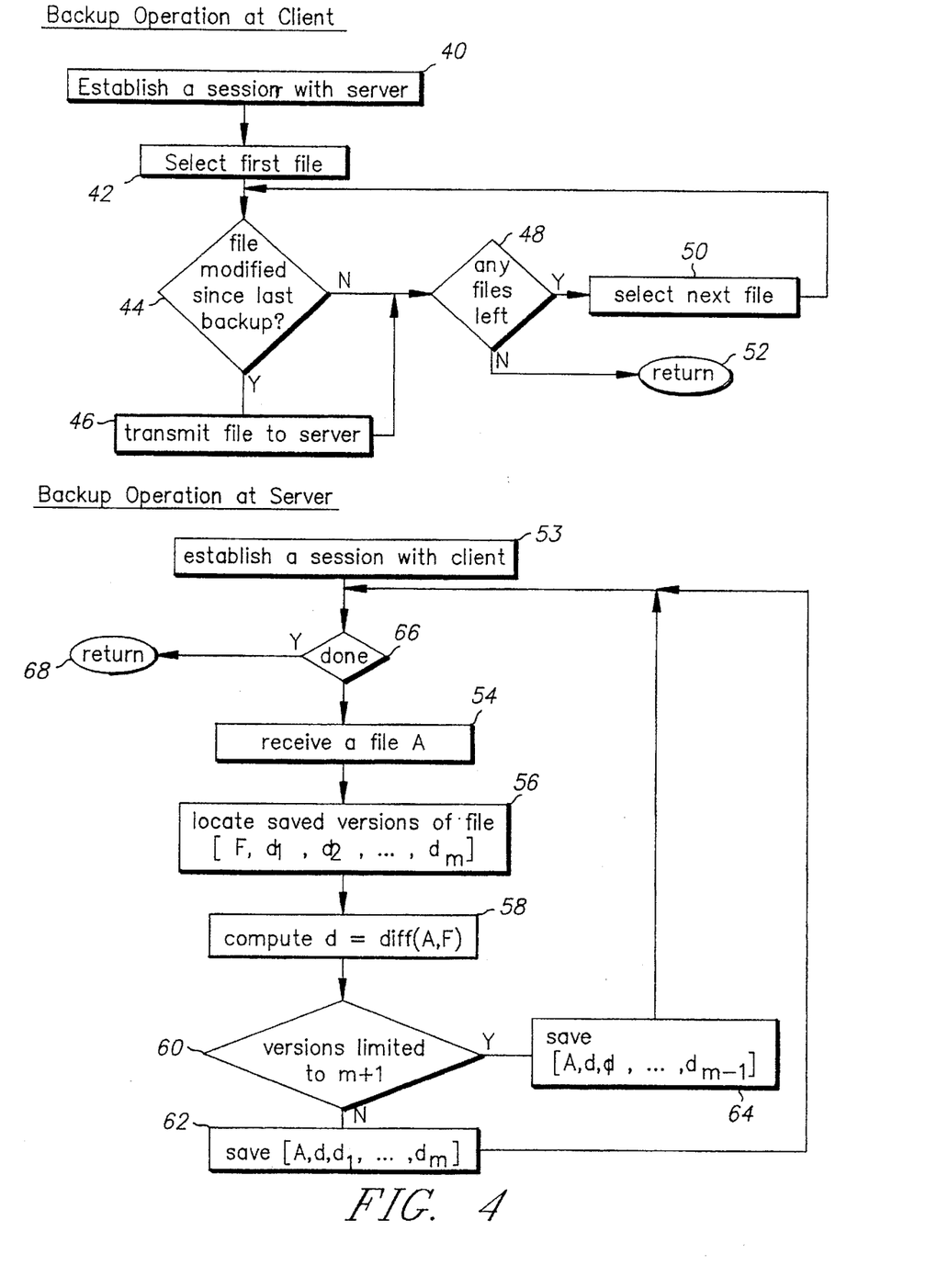
FIG. 4 is a flow chart illustrating an alternate embodiment of the present invention.

With reference now to FIG. 4, there is shown a high level logic flow chart of an alternative embodiment utilizing differencing at the server in accordance with the method and system of the present invention for reducing backup storage requirement. With reference now to FIGS. 2 and 4, this method proceeds as follows:

The client backup program, residing at the client 21, establishes a backup session with the backup server 25 by contacting the server backup program as depicted by block 40. Concurrently the server backup program establishes a session with the client 21. Thereafter, the client backup program select the first file at the client 21 for examination as depicted by block 42. Next, as depicted by block 44, the file is examined to find out if it has been modified since last backup. If the file has been modified since last backup, it is then transmitted to the server 25, using the communication link 23 which connects the client computer 21 to the server 25, as depicted by block 46. If the file has not been modified since last backup, the backup program determines if any file is left on the client 21 that has not been checked as depicted by block 48. If any file is left the next file is selected as depicted by block 50 and examined to find out if it has been modified since last backup as depicted by block 44. If no file is left, then the backup session is terminated as depicted by block 52.

Still referring to FIGS. 2 and 4, assuming that the client 21 has detected a changed file A according to the method described in the previous paragraph, and a communication session has been established between the client 21 and the server 25 (as depicted by block 53), the file is transmitted to the server 25. The server 25 then receives the file A as depicted by block 54, consults the backup catalog, and locates the saved versions of the file (block 56), referred to as versioned sequence:

$$[F, d\_1, \ldots, d\_m]$$

which is stored at server storage mediums and where F is the base file, $(d\_1, \ldots, d\_m)$ are delta files, and the versioned sequence represents a total of m+1 previous versions of the file A. Either immediately, or at some later point in time (if for example, the server was busy or it had to retrieve F and associated delta files from tertiary storage (optical or tape library) as oppose to primary (semiconductor) or secondary (magnetic) storage), the server carries out the differencing operation:

$$d=\text{diff}(A,F)$$

using the server processor as depicted by block 58. Thereafter the server backup program checks the server policy management of parameters to decide if the number of the versions of the file that may be retained is limited to m+1 (block 60). If there is no m+1 limit, then the versioned sequence is updated, using the server processor, which result in:

[A, d, d_1, ..., d_m]

which is then stored at backup storage medium 26 as depicted by block 62.

If the server policy management of parameters requires that only m+1 versions be retained, the last (oldest) delta d_m would be deleted, or "expired", resulting in the representation:

[A, d, d_1, ..., d_m-1]

which is saved on the backup storage medium 26 as depicted by block 64.

The process then moves to block 66 to decide whether the client has signalled that the session should be exited (as, for example, where there are no more files to backup). If the session is over the backup operation terminates as depicted by block 68. Otherwise, the operation depicted by blocks 54 through 66 are repeated.

In the event that the most recent backed up copy of the file A were to be restored, the server would locate and transmit to the client the file A. In the event that an older version of the file A is required, the "rollback" operation illustrated above is applied repeatedly until the desired version of the file is obtained and then transmitted to the client.

In another alternative embodiment, deferred application of deltas at the server 25 is utilized. This is useful if the server 25 is managing its storage using a hierarchical storage method, i.e., it moves older files from secondary to tertiary storage (e.g., a tape library).

1. The client 21 keeps a copy of the base file F from the last time it was backed up (for some subset of the files as described above)—this copy is denoted by letter F'. The copy F' is kept in a cache reserved for previously backed up files at the client 21.

2. A changed version of the file, denoted A, is found by the client 21. If the copy F' of the previous backed up version is found, the client 21 computes d=diff(F',A), and sends d to the server 25.

3. At the server 25, it is found that the file versions are stored as:

[d_1, d_2, ..., d_n, F, d_n+1, ..., d_m].

The server 25 updates this version history to:

[d, d_1, d_2, ..., d_n, F, d_n+1, ..., d_m]

or possibly:

[d_1, d_2, ..., d_n, F, d_n+1, ..., d_m-1], if expiry is dictated according to policy management on parameter expiration.

Note that the bulky file in this history is F, and F may have migrated to tertiary storage (tape or optical library).

4. At some convenient time (e.g, at low load epochs, or when the removable storage containing F happens to be mounted) then the file history can be "rolled forward" resulting in:

[A', d_1, ..., d m].

This is referred to as deferred application of deltas.

5. If the client 21 needs to restore file A, it first checks to see whether it is found in the cache of step 1. If not, it requests a copy from the server 25, and the server 25 immediately locates and returns the file history. If the roll forward operation of step 4 has occurred, A' is immediately returned to the client. If not, step 4 is carried out.

Note that it is also advantageous for the base version of a file and its deltas to be stored "collocated", i.e., on the same removable volume. A method for achieving collocation is described in the co-pending U.S. patent application Ser. No. 08/198,972, filed Mar. 22, 1994, entitled System And Method for Managing A Hierarchical Storage System, by Cabrera, Rees and Coy, and assigned to the assignee of the present application.

A number of embodiments of the present invention have been described. Nevertheless, it will be understood that various modifications may be made without departing from the spirit and the scope of the invention. Accordingly, it is to be understood that the invention is not to be limited by the specific illustrated embodiments, but only by the scope of the appended claims.

We claim:

1. A method for reducing storage requirements and transmission loads in a client-server environment having a client and a backup subsystem, the backup subsystem comprising a backup server, a server backup program, a storage medium, and a copy of a versioned sequence of a file stored in the storage medium, said versioned sequence comprising a base version of said file and predetermined number of delta files, the client having a copy of the base version of said file stored in a client storage medium, the client and the server are connected to each other by a communication link, comprising the steps of:

establishing a backup session between the client and the backup server;

detecting a changed version of said file at the client;

differencing, using the client, the changed version of said file and the base version of said file at the client to create a delta file; and transmitting said delta file, using said communication link, to the backup subsystem.

2. A method as recited in claim 1 further including the steps of:

generating the changed version of said file at the backup subsystem using said delta file and the base version of said file;

storing said delta file in the backup subsystem; and storing the changed version of said file as the new base version of said file in the backup subsystem.

3. A method as recited in claim 2 further including the step of deleting the base version of said file at the backup subsystem after generating the changed version of said file at the backup subsystem.

4. A method as recited in claim 1 wherein the step of differencing at the client further includes the steps of:

checking the storage medium at the client to determine if a copy of the base version of said file is available in the client storage medium;

requesting a copy of the base version of said file from the backup subsystem if a copy of the base version of said file is not available in the client storage medium; and receiving a copy of the base version of said file, using the communication link, from the backup subsystem if a copy of the base version of said file is not available in the client storage medium.

5. A method as recited in claim 1 wherein said client storage medium is a cache memory.

6. A method as recited in claim 4 further including the step of deleting the oldest delta file in said versioned sequence after storing the new base version of said file in the backup subsystem.

7. A method as recited in claim 1 wherein said communication link is a transmission line.

8. A method as recited in claim 1 wherein said backup server is a personal computer.

9. A method as recited in claim 1 wherein said backup server is a workstation.

10. A method as recited in claim 1 wherein said backup subsystem storage medium comprises a magnetic storage device.

11. A method as recited in claim 1 wherein said backup subsystem storage medium comprises an optical storage device.

12. A method as recited in claim 1 wherein said backup subsystem storage medium comprises a tape storage device.

13. In a client-server environment having a client and a backup subsystem, said backup subsystem comprising a backup server and a backup storage medium, and where the client comprises a client storage medium, said client and said backup server connected to each other by a communication link, a method for reducing the storage requirements and transmission loads in said client-server environment, comprising the steps of:

storing a versioned sequence of a file, using the backup storage medium, in the backup subsystem, said versioned sequence comprising a base version of a file and a predetermined number of delta files;

transmitting, using the communication link, a copy of said base version of the file to the client whenever the client needs to further process said file;

differencing, using the client, a changed version of said file and the base version of said file to create a delta file;

transmitting, using the communication link, said delta file to the server; and storing said delta file in the backup subsystem storage medium.

14. A method as recited in claim 13 further including the steps of:

creating the changed version of said file at the backup subsystem using said delta file and the base version of said file;

storing the changed version of said base file at the backup subsystem; and deleting the base version of said file from the backup subsystem.

15. A method as recited in claim 13 further including the step of storing a copy of the base version of said file in the client according to an established qualification criteria.

16. A method as recited in claim 13 further including the step of storing the changed version of said file in the client at the completion of differencing the changed version of said base file and the base version of said file.

17. A method as recited in claim 13 further including the step of storing said delta file in the backup subsystem so the base version of said file can be updated at a later time.

18. In a client-server system having a client and a backup subsystem, the backup subsystem comprising a backup server and a backup storage medium, and where the client comprises a client storage medium, the client and the backup server connected to each other by a communication link, the client-server environment comprising:

means for storing a versioned sequence of a file comprising a base version of a file and a predetermined number of delta files in the backup subsystem;

means for transmitting a copy of the base version of said file to the client whenever the client needs to further process said file;

means for differencing a changed version of said file and the base version of said file to create a delta file at the client;

means for transmitting said delta file to the backup subsystem; and means for storing said delta file in the backup subsystem.

19. A system as defined in claim 18 further comprising:

means for creating the changed version of said file at the backup subsystem using the base version of said file;

means for storing the changed version of said file at the backup server; and means for deleting the base version of said file at the backup server.

20. In a client-server environment having a client and a backup subsystem, the backup subsystem comprising a backup server and a backup storage medium, and where the client comprises a client storage medium, the client and the server connected to each other by a communication link, said client-server environment comprising:

means for storing a versioned sequence of a file comprising a base version of a file and a predetermined number of delta files in the backup subsystem;

means for storing a copy of the base version of said file in the client;

means for processing a changed version of said file at the client;

means for differencing the changed version of said file and the base version of said file to create a delta file at the client;

means for transmitting the delta file to the server; and means for storing said delta file in the backup subsystem so the base version of said at the backup subsystem can be updated at a predetermined time.

21. A system as defined in claim 20 further comprising:

means for creating the changed version of said file at the backup subsystem using the delta file and the base version of said file;

means for storing the changed version of said file at the backup server; and means for deleting the base version of said file at the backup server.

* * * * *